UNITED STATES PATENT OFFICE.

ALEXANDER CLASSEN, OF AACHEN, GERMANY.

PROCESS OF CONVERTING STARCH INTO FERMENTABLE SUGAR.

SPECIFICATION forming part of Letters Patent No. 654,439, dated July 24, 1900.

Application filed January 29, 1900. Serial No. 3,203. (No specimens.)

*To all whom it may concern:*

Be it known that I, ALEXANDER CLASSEN, a citizen of Germany, residing at Aachen, in the Empire of Germany, have invented a certain new and useful Process for Converting Starch into Fermentable Sugar, (for which I have made application for patents in the following countries, viz: Germany, September 21, 1899; Denmark, December 4, 1899; Sweden, December 8, 1899; Finland, December 22, 1899; France, January 3, 1900, and Belgium, January 3, 1900,) of which the following is a specification.

My invention relates to a process for converting starch into fermentable sugar by heating the starch with a mixture of sulphurous acid and sulphuric acid. For this purpose one part, by weight, of starch or a corresponding quantity of a material containing starch is mixed with three parts, by weight, of sulphurous acid containing three per cent. or more of acid, and the mixture is heated in a closed vessel to about 80° centigrade, at which temperature the starch is completely dissolved. The solution is then subjected to the action of sulphuric acid either by introducing a solution thereof in such quantity that the mixture may contain about 0.2 per cent. of sulphuric acid, or, better, by introducing some suitable oxidizing agent, such as air or a manganate or permanganate in quantity sufficient to produce the said proportion of sulphuric acid. The temperature is now raised to 110° to 120° centigrade, and after heating for about one hour the pressure may be relieved. The percentage of sugar in the solution thus obtained may be increased by adding more sulphurous acid to the solution and utilizing it for conversion of further material.

By using both sulphurous acid and sulphuric acid the yield of fermentable sugar is greater than when either acid is used separately, and what is equally important the formation of products which more or less hinder fermentation is excluded.

For the mixture of sulphurous acid and sulphuric acid in the foregoing description may be substituted a mixture of sulphurous acid and hydrochloric acid, the latter containing 0.2 to two per cent. of acid, hydrochloric acid being for the purpose of this invention equivalent to sulphuric acid.

Having thus described the nature of this invention and the best means I know for carrying the same into practical effect, I claim—

The process for converting starch into fermentable sugar which consists in heating the starch in a closed vessel at a temperature of 80° centigrade, with a solution of sulphurous acid, then subjecting the liquid thus obtained to the action of sulphuric acid and then heating this mixture of partially-converted starch, sulphurous acid and sulphuric acid, at a temperature of 110° to 120° centigrade, substantially as described.

In testimony whereof I have hereunto set my hand in presence of two subscribing witnesses.

ALEXANDER CLASSEN.

Witnesses:
C. E. BRUNDAGE,
G. SCOTT.